United States Patent [19]
Maeland et al.

[11] Patent Number: 4,783,329
[45] Date of Patent: Nov. 8, 1988

[54] HYDRIDING SOLID SOLUTION ALLOYS HAVING A BODY CENTERED CUBIC STRUCTURE STABILIZED BY QUENCHING NEAR EUCTECTOID COMPOSITIONS

[75] Inventors: Arnulf J. Maeland, Succasunna; George G. Libowitz, Brookside; George Rak, Pinebrook, all of N.J.

[73] Assignee: Allied-Signal Inc., Morris Township, Morris County, N.J.

[21] Appl. No.: 88,479

[22] Filed: Aug. 19, 1987

Related U.S. Application Data

[63] Continuation of Ser. No. 807,906, Dec. 11, 1985, abandoned.

[51] Int. Cl.$^4$ .................................... C01B 6/24
[52] U.S. Cl. ...................... 423/644; 423/645; 420/417; 420/418; 420/421; 420/900; 148/421
[58] Field of Search ............... 423/644, 645; 420/417, 420/418, 421, 900; 148/421

[56] References Cited

U.S. PATENT DOCUMENTS

| | | | |
|---|---|---|---|
| 3,880,655 | 4/1975 | Glazunov et al. | 420/418 |
| 4,075,312 | 2/1978 | Tanska et al. | 423/648 |
| 4,126,449 | 11/1978 | Tanner et al. | 420/417 |
| 4,228,145 | 10/1980 | Gamo et al. | 423/644 |
| 4,283,226 | 8/1981 | van Mal et al. | 423/644 |
| 4,386,974 | 6/1983 | Amano et al. | 423/644 |
| 4,412,982 | 11/1983 | Wallace et al. | 423/644 |
| 4,425,318 | 1/1984 | Maeland et al. | 423/644 |
| 4,440,736 | 3/1984 | Maeland et al. | 423/644 |
| 4,440,737 | 3/1984 | Libowitz et al. | 423/644 |

FOREIGN PATENT DOCUMENTS 146910  12/1978  Japan ............................... 420/900

OTHER PUBLICATIONS

Bressel et al, "Ber Bunsenges. Phys. Chem.", vol. 86, 1982, pp. 1139–1143.
J. J. Reilley et al., "Formation and Properties of Iron Titanium Hydride", *Inorganic Chemistry*, vol. 13, No. 1, 1974, pp. 218–222.
J. F. Lynch et al., "The Titanium Molybdenum Hydrogen System: Isotope Effects, Thermodynamics, and Phase Changes", American Chemical Society, vol. 167, 1978, pp. 342–365.

*Primary Examiner*—Robert L. Stoll
*Attorney, Agent, or Firm*—Ernest D. Buff; Gerhard H. Fuchs

[57] ABSTRACT

The present invention relates to the reaction of hydrogen gas with alloys having body-centered cubic phase structure at a temperature of less than 100° C. which comprise titanium and a second metal selected from the group consisting of zirconium, rhenium, manganese, and iron, and further comprising when the second metal is zirconium or rhenium, at least about 1 atom percent of a third metal selected from the group of aluminum, cobalt, chromium, iron, manganese, nickel, copper, silicon, germanium, gallium and mixtures thereof. The alloys of this invention react with hydrogen at a reaction rate much faster than prior art materials.

6 Claims, No Drawings

HYDRIDING SOLID SOLUTION ALLOYS HAVING A BODY CENTERED CUBIC STRUCTURE STABILIZED BY QUENCHING NEAR EUCTECTOID COMPOSITIONS

This application is a continuation of application Ser. No. 807,906 filed Dec. 11, 1985, now abandoned.

BACKGROUND OF THE INVENTION

The present invention relates to the reaction of hydrogen gas with body centered cubic phase alloys, and particularly to the rapid reaction at mild temperatures of hydrogen gas with solid solution alloys having a body centered cubic phase structure.

Most metals that form hydrides react very slowly in bulk form at room temperature with hydrogen gas. Metallic niobium and metallic vanadium, for example, are relatively inert in bulk form at room temperature in the presence of hydrogen gas, with the hydrogen only slowly reacting with the body centered phase structure of each metal to form a precipitated niobium hydride or vanadium hydride. In the case of niobium, for example, attempts to increase the rate of reaction by plating the niobium with nickel or palladium or iron have been reported.

Metallic titanium is also relatively inert in the bulk form at room temperature in the presence of hydrogen gas. With titanium, the hydrogen only slowly reacts with the hexagonal close packed phase structure of titanium to form a precipitated titanium hydride.

In addition to the metals which form hydrides, a variety of alloys and intermetallic compounds which react with hydrogen are known in the art. U.S. Pat. No. 4,075,312 (Tanaka et al.) discloses titanium alloy hydride compositions containing at least one metal selected from the group consisting of vanadium, chromium, manganese, molybdenum, iron, cobalt, and nickel. J. J. Reilly et al., *Inorganic Chemistry*, 1974, Vol. 13, page 218, disclose intermetallic compounds of iron and titanium, FeTi and Fe$_2$Ti, which form iron titanium hydrides. J. F. Lynch et al., *Advances in Chemistry*, 1978, Vol. 167, pp. 342–365, disclose titanium-molybdenum alloys useful for hydrogen isotope separation. U.S. Pat. No. 4,228,145 (Gamo et al.) discloses a Laves phase intermetallic compound, TiMn$_2$, which forms hydrides.

For many applications of metal hydrides, such as hydrogen storage, it is desirable to form the hydride from bulk metal or alloy, pulverize the hydride into some of granular or powdered structure, and thereafter cyclically remove hydrogen to form a lower hydride or the free metal or alloy, and thereafter reintroduce hydrogen to form the hydride. Starting with the bulk metals or bulk alloys described heretofor, it is necessary to go through an induction period, wherein the metal is heated to a high temperature such as 300° C.-700° C., then reacted with hydrogen at high pressure and then cooled very slowly until a temperature below about 100° C. is reached (preferably about room temperature). At the high temperature, the rate of hydrogen dissolving in the metal is increased so as to achieve saturation in a matter of minutes rather than hours or days. At the high temperature, however, the equilibrium hydrogen pressure is so high that relatively little hydrogen actually dissolves to form hydrides. Accordingly, it is only upon a gradual cooling that sufficient hydride is formed. While many metals require only a single induction process to form the hydride, with the subsequent hydride powder cycling at a reasonable reaction rate, it should be apparent that the induction process represents a distinct disadvantage in forming and utilizing metal hydrides.

Recently, it has been discovered that certain body centered cubic solid solution alloys react rapidly with hydrogen at mild temperatures. More particularly, U.S. Pat. Nos. 4,425,318 (Maeland et al.) and 4,440,737 (Libowitz et al.) disclose body centered cubic solid solution alloys of niobium, vanadium, and tantalum (among others) which react rapidly with hydrogen under mild conditions. In addition, U.S. Pat. No. 4,440,736 (Maeland et al.) discloses titanium based alloys which react rapidly with hydrogen under mild conditions in which the body centered cubic structure has been stabilized by the addition of a body centered cubic metal such as vanadium, niobium or molybdenum.

BRIEF DESCRIPTION OF THE INVENTION

It has been surprisingly found that certain titanium-based solid solution alloys having a body-centered cubic structure even in bulk form react rapidly with hydrogen at mild temperatures (below about 100° C., and even at room temperature) forming hydrides in a matter of seconds or minutes. The titanium-based solid solution alloys of the present invention are unique in that the second metal need not necessarily have a body-centered cubic phase structure.

Accordingly, the present invention includes a method of producing a metal hydride which comprises reacting hydrogen gas at a temperature of less than or equal to about 100° C. with a solid solution alloy having a body-centered phase structure, said alloy comprising a body-centered cubic phase structure comprising titanium and a second metal selected from the group consisting of zirconium, rhenium, manganese and iron and having dissolved therein, when said second metal is zirconium or rhenium, at least about 1 atom percent of a third metal selected from the group consisting of aluminum, cobalt, chromium, iron, manganese, nickel, copper, silicon, germanium, gallium and mixtures thereof.

The present invention is also directed to solid solution alloys having a body-centered cubic phase structure of the general formula $(Ti_{1-x}Re_x)_{1-y}M_y$ where M is a metal selected from the group consisting of aluminum, cobalt, chromium, copper, iron, gallium, germanium, silicon, manganese, and nickel, wherein about $0.1 \leq x \leq$ about $0.4$ and wherein y varies from at least about 0.01 up to the solubility limit of M in the solid solution.

The invention is also directed to solid solution alloy hydrides of the general formula $(Ti_{1-a}Zr_a)_{1-b}M_bH_z$ wherein M is a metal selected from the group described supra, wherein about $0.2 \leq x \leq$ about $0.8$, wherein b varies from at least about 0.05 up to the solubility limit of M in the body-centered cubic phase, and wherein $0 < z \leq 2$.

The invention is also directed to metal alloy hydrides having the general formula $(Ti_{1-x}Re_x)_{1-y}M_yH_z$ wherein the solid solution alloys are as described hereinabove and wherein $0 < z \leq 2$.

The invention is further directed to an alloy hydride having the general formula $Ti_{1-q}Mn_qH_z$ wherein $0.07 \leq q \leq 0.19$ and wherein $0 < z \leq 2$.

DETAILED DESCRIPTION OF THE INVENTION

The present invention involves the reaction of hydrogen gas at low temperatures with a solid solution alloy having a body-centered cubic structure within the following general systems: Ti/Zr/M, Ti/Re/M, Ti/Mn, Ti/Fe, wherein M is at about 1 least atom percent of a metal selected from the group of Al, Co, Cu, Ni, Fe, Mn, Cr, Ga, Ge, Si or mixtures thereof. The body-centered cubic (bcc) structure exists in the binary solid solution alloys of Ti with Zr, Re, Mn and Fe, notwithstanding the fact that most of the metals within this group do not exhibit a bcc structure at low temperatures. The bcc structure of these alloys is produced at elevated temperatures and stabilized at low temperatures by quenching alloy compositions from the tempereature at which the bcc structure is formed to a temperature below about 100° C., preferably to room temperature ($\approx$23° C.). Most preferably, the alloy compositions which are most easily stabilized in the bcc structure at low temperatures are those compositions which approach the eutectoid composition of the binary system. Within the general systems described above, the addition of a metal having an atomic radius of at least about 5 percent smaller that the average metallic radius the Ti or the Ti binary alloy is critical to the alloys with establishment of a fast reaction rate of the alloys with hydrogen. The small radius metal affects the hydrogen storage capacity of the solid solution alloy (defined as the atom ratio of hydrogen to metal) and the dissociation pressure of the hydride so formed. In the case of Ti/Mn and Ti/Fe, the second metal itself has an atomic radius of at least about 5 percent smaller than that of titanium. In the case of Ti/Zr and Ti/Re, a third metal, M, having, an atomic radius at least about 5 percent smaller than the average metallic radius of the binary solid solution alloy comprising titanium and a second metal, i.e., Zr or Re, is added. The alloys described herein have the distinct advantage of reacting rapidly with hydrogen at temperatures at or below about 100° C. Because many of the reactions within the scope of the present invention are highly exothermic, it is contemplated that the temperature may, for a short time, exceed 100° C., but the higher temperature will not adversely effect the reaction rate. However, it is preferred to initiate the reaction at below about 50° C., with room temperature being a most preferred starting temperature. In fact, in many of the present reactions, generation of heat acts as the rate limiting step, with the reaction taking place in seconds if adequate heat removal is provided. Thus, the alloys of the present invention may be used as means for removing hydrogen or its isotopes from gases, means for storing hydrogen in the form of hydrides of the solid solution alloys, as getter materials, or as means to maintain a constant hydrogen pressure in thyratron tubes.

Titanium metal exists as a hexagonal closed packed phase at room temperature, but transforms to the body-centered cubic phase structure at 882.5° C. The addition of selected amounts of certain second metals, namely zirconium, rhenium, manganese and iron to the titanium results in the formation of solid solutions having body-centered cubic structures which will be stable at room temperature when quenched from this elevated temperature. The quench rates necessary to achieve the stabilization will vary depending upon the specific alloy composition. However, as a general rule, Ti/Mn alloys will require a quench rate of between about 1°-100° C./sec or higher, preferably at least about 10° C./sec and Ti/(Zr, Re, or Fe) alloys will require a quench rate of at least about 10° C./sec. It should also be apparent that the quench rate should not be so high as to produce a glassy (amorphous) alloy.

Stabilization of the body-centered cubic structure is most preferably achieved by quenching solid solutions of compositions at or near the eutectoid composition of the binary system. For example, fifty atom percent zirconium added to titanium readily results in a composition having a body-centered cubic phase structure at room temperature after quenching. Most generally, relatively stable bcc phase solid solution alloys exist at low temperatures in the following alloy systems:

(a) $Ti_{1-n}Fe_n$ where n is between about 0.04 and about 0.17.

(b) $Ti_{1-q}Mn_q$ where q is between about 0.07 and about 0.19.

(c) $Ti_{1-x}Re_x$ where x is between about 0.1 and about 0.4.

(d) $Ti_{1-a}Zr_a$ where a is between about 0.2 and about 0.8.

An important aspect of the invention is the appreciation that the stabilizing metal need not exhibit a bcc structure in and of itself. Thus, the addition of Zr(which exhibits an hexagonal close packed structure) and/or the addition of Re or Mn (which exhibit complex structures) to the hexagonal close packed titanium will produce a stabilized body-centered cubic structure at room temperature after quenching.

In order to increase the rate of hydride formation of the alloys, it is critical that one component of the alloy has an atomic radius which is at least about 5 percent smaller than the average atomic radius of the titanium (in binary systems) and the titanium binary alloy (in tertiary alloy systems). As noted heretofor, in those alloys including manganese and iron (to stabilize the body-centered cubic structure in titanium), no third metal is necessary to increase hydride formation rates, since these metals have radii which are at least about 5 percent smaller than titanium. Thus, a twofold advantage is acheived by these binary alloys; namely, a stabilized bcc structure at room temperature and a high rate of hydride formation. When the stabilizing metal is zirconium or rhenium, it is necessary to employ at least about 1 atom percent of a third metal selected from the group consisting of aluminum, cobalt, chromium, copper, manganese, nickel, iron, gallium, germanium, and silicon. For those third metals having suitable solubilities, the range of between about 2 atom percent up to about 15 atom percent of the third metal is preferred. However, when using certain third metals, for example Fe, exceeding the solubility limit of the Fe will not interfere with the operation of the process of the present invention.

Within the solid solution alloys having the general formula $Ti_{1-q}Mn_q$, wherein $0.07 \leq q \leq 0.19$, it is most preferred to employ alloys which have values of q in the vicinity of the eutectoid composition, q varying from about 0.13 to about 0.15. In the form of the hydride, the values for q are as defined herein and for the composition generally defined as $Ti_{1-q}Mn_qH_z$, $0 < z \leq 2$.

Similarly, within the alloy system generally represented as $Ti_{1-n}Fe_n$, it is preferred to employ solid solution alloys wherein $0.1 \leq n \leq 0.15$. The hydride formed from this binary alloy system would be defined by the formula $Ti_{1-n}Fe_nH_z$ wherein $0 < z \leq 2$.

In yet another embodiment of the present invention, solid solution alloys having the general formula $(Ti_{1-x}Re_x)_{1-y}M_y$ preferably contain between about 18 to about 23 atom percent Re and at least about 1 atom percent up to the solubility limit of M in the solid solution. The amount of M is selected to vary the disossociation pressure of the resultant hydride. Thus, the hydrogen storage capacity of the solid solution alloy within this system Ti/Re/M will vary from at least about 0.1 up to a maximum of about 2 atoms of hydrogen per gram atom of solid solution alloy.

In still another embodiment of the present invention, the preferred solid solution alloys within the group having the general formula $(Ti_{1-a}Zr_a)_{1-b}M_b$ are those solid solution alloys wherein $0.45 \leq a \leq 0.55$ and wherein $0.01b \leq$ the solubility limit of M in the solid solution.

The following examples illustrate the present invention and show by comparison certain metals and alloys outside the scope of the present invention which react slowly or not at all with hydrogen at mild temperatures. It should be understood that the examples should not be construed as limiting the scope of the present invention and that various additions, deletions and modifications are contemplated within the scope of the invention described hereinabove.

EXAMPLE 1

Ti/Zr/M Systems

Alloys were prepared by arc melting on a water-cooled copper hearth under argon. The following compositions were prepared: $Ti_{0.5}Zr_{0.5}$, $(Ti_{0.5}Zr_{0.5})_{0.9}Fe_{0.10}$, and $(Ti_{0.5}Zr_{0.5})_{0.93}Mn_{0.07}$. Each sample was approximately 4g. The alloys were cast into buttons approximately 10-12mm in diameter and 7-9 mm height. Each button was allowed to cool under argon to near room temperature. The casting and cooling process was repeated 3-4 times to ensure homogenization. Although neither Ti nor Zr have the bcc structure at room temperature (both are hcp), x-ray diffraction patterns of the alloy samples showed that the structures produced by this process were predominantly body-centered cubic. Each button was placed in a stainless steel boat inside a quartz tube and was outgassed at 450° C. under a vacuum of better than $2 \times 10^{-5}$ Pa. After cooling to room temperature, hydrogen was admitted at a pressure of about 1 atm. (0.1 MPa). The $Ti_{0.5}Zr_{0.5}$ sample showed no reaction with hydrogen at room temperature after three days, but the other samples reacted at room temperature at different rates. Samples containing 10% Fe were 80% complete within 6 to 15 minutes. The sample containing Mn reacted more slowly, reaching a value of H/M=1.05 after 18 hours.

EXAMPLE 2

Ti/Re/M Ternary Systems

The procedure of Example 1 for preparation of alloy was repeated for an alloy of composition of $Ti_{0.8}Re_{0.20}$. Neither Ti nor Re have the bcc structure at room temperature, but x-ray diffraction patterns showed the alloy to have body-centered cubic structure with a lattice parameter of 0.3209 mm. The alloy absorbed no hydrogen gas when exposed to one atom of hydrogen gas at room temperature for over 16 hours.

Another alloy containing the same ratio of Ti/Re but with 5 atom percent of iron added [i.e., of formula $(Ti_{0.8}Re_{0.2})_{0.95}Fe_{0.05}$] was prepared in the same manner. When exposed to $H_2$ gas at one atm. and room temperature, the alloy reacted extremely rapidly to form $(Ti_{0.8}Re_{0.2})_{0.95}Fe_{0.05}H_{1.32}$ in less than 9 minutes.

The same procedure was carried out on an alloy containing Ni of composition $(Ti_{0.8}Re_{0.2})_{0.95}Ni_{0.05}$. It reacted in about 7 minutes to form a hydride of composition $(Ti_{0.8}Re_{0.2})_{0.95}Ni_{0.05}H_{1.28}$.

EXAMPLE 3

Ti/Mn Solid Solution Alloy

A 5g alloy sample of the eutectoid composition $Ti_{0.82}Mn_{0.18}$ was prepared by arc melting using the procedure described in Example 1. Although neither Ti nor Mn are body-centered cubic at room temperature, and notwithstanding the fact that these two metals form an intermetallic compound $TiMn_2$ having the Laves phase structure, x-ray diffraction measurements showed that the eutectoid composition had the body-centered cubic structure with a lattice parameter of 0.3197 mm. The bcc alloy sample was exposed to hydrogen at room temperature according to the procedure described in Example 1. Immediate reaction with hydrogen occurred, and the reaction was 80% complete in about 11 minutes. No third metal was necessary in this case because the metallic radius of Mn (0.137 mm) is 7% smaller than that of Ti (0.147 mm).

EXAMPLE 4

Ti/Fe Solid Solution Alloy

An alloy sample of titanium and iron was prepared by the procedure described in Example 1 at a composition $Ti_{0.85}Fe_{0.15}$, which is very close to the eutectoid composition. X-ray diffraction measurements showed that the sample was completely body-centered cubic with a lattice parameter of 0.3216 mm. This alloy, in which Ti and Fe atoms are randomly distributed over the bcc sites, is different from the intermetallic compound TiFe which has the CsCl structure with a lattice parameter of 0.2975 mm.

The alloy was exposed to hydogen at room temperature under the conditions described in Example 1. No reaction occurred in the first 30 minutes, but within the following 40 minutes, the sample reacted violently to form $Ti_{0.85}Fe_{0.15}H_{1.52}$. The intermetallic compound TiFe does not react with hydrogen at room temperature without prior activation.

There is no need to add a third metal to the solid solution alloy $Ti_{0.85}Fe_{0.15}$ to induce rapid reaction with hydrogen because the metallic radius of Fe (0.126 mm) is 14% less than that of Ti (0.147 mm).

We claim:

1. A method of producing a metal hydride which comprises reacting hydrogen gas at a temperature between about 0° C. and about 100° C. with a solid solution alloy having a body-centered cubic phase structure, said alloy comprising titanium and a metal capable of producing a stable body-centered cubic phase structure in titanium at less than 100° C., said metal being selected from the group consisting of zirconium, rhenium, manganese and iron and having dissolved therein, when said metal is zirconium or rhenium, at least about 1 atom percent of another metal selected from the group consisting of aluminum, cobalt, chromium, iron, manganese, nickel, copper, silicon, germanium, gallium and mixtures thereof, a constituent of said solid solution alloy having an atomic radius at least about 5less than the atomic radius of the body-centered cubic phase material.

2. The method of claim 1 wherein the temperature is less than about 50° C.

3. A metal hydride having the general formula $(Ti_{1-x}Re_x)_{1-y}M_yH_z$ wherein M is selected from the group consisting of aluminum, cobalt, chromium, copper, iron, gallium, germanium, silicon, manganese, nickel and mixtures thereof, wherein about $0.1 \leq x \leq$ about 0.4, wherein y varies from at least about 0.05 up to the solubility limit of M in the body-centered cubic alloy, $Ti_{1-x}Re_x$ and wherein $0 \leq z \leq$ about 2.

4. A metal hydride having the general formula $(Ti_{1-a}Zr_a)_{1-b}M_bH_z$ wherein about $0.2 \leq a \leq$ about 0.8, wherein b is from about 0.01 up to the solubility limit of M in the solid solution alloy $Ti_{1-a}Zr_a$, wherein M is selected from the group consisting of aluminum, cobalt, chromium, copper, iron, gallium, germaniu, silicon, manganese, nickel and mixtures thereof and wherein $0 < z <$ about 2.

5. The metal hydride of claim 4 wherein $0.45 \leq a \leq 0.55$ and wherein b varies from at least about 0.05 up to the solubility limit of M.

6. An alloy having a stable body-centered cubic phase structure at a temperature of less than about 100° C. and comprising titanium and rhenium in a Ti to Re ratio of between about 9:1 and about 3:2 and at least about 1 atom percent of a metal selected from the group consisting essentially of aluminum, cobalt, chromium, copper, iron, gallium, germanium, silicon, manganese, nickel and mixtures thereof.

* * * * *

UNITED STATES PATENT AND TRADEMARK OFFICE
CERTIFICATE OF CORRECTION

PATENT NO. : 4,783,329
DATED : November 8, 1988
INVENTOR(S) : A.J. Maeland et al.

It is certified that error appears in the above-identified patent and that said Letters Patent is hereby corrected as shown below:

Col. 3, line 27: add -- of -- at the beginning of the line.
        line 27: delete "alloys with" at the end of the line.
        line 36: after "having" delete the comma.
Col. 5, line 16: "0.01b" should read -- $0.01 \leq b$ --.
Col. 6, line 66: "5less" should read -- 5% less --.

Signed and Sealed this

Twenty-seventh Day of June, 1989

Attest:

DONALD J. QUIGG

Attesting Officer     Commissioner of Patents and Trademarks